(12) United States Patent
Tokunaga et al.

(10) Patent No.: US 6,452,382 B1
(45) Date of Patent: Sep. 17, 2002

(54) ENCODER PROVIDED WITH GIANT MAGNETORESISTIVE EFFECT ELEMENTS

(75) Inventors: Ichirou Tokunaga; Seiji Kikuchi, both of Miyagi-ken; Yoshito Sasaki; Takashi Hatanai, both of Niigata-ken, all of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/352,170

(22) Filed: Jul. 12, 1999

(30) Foreign Application Priority Data

Jul. 17, 1998 (JP) .......................................... 10-204068

(51) Int. Cl.[7] .............................. G01B 7/30; H01L 43/08
(52) U.S. Cl. ................. 324/207.21; 324/252; 338/32 R
(58) Field of Search ....................... 324/207.21, 207.25, 324/249, 252; 338/32 R; 360/113, 313, 314, 324

(56) References Cited

U.S. PATENT DOCUMENTS

| 5,561,368 A | 10/1996 | Dovek et al. ................. 324/252 |
| 5,686,837 A | 11/1997 | Coehoorn et al. ............ 324/252 |
| 6,031,372 A | * 2/2000 | Van Den Berg ............. 324/252 |
| 6,154,025 A | 11/2000 | Schelter et al. ........ 324/207.21 |

FOREIGN PATENT DOCUMENTS

| DE | 195 20 206 C2 | 3/1997 |
| DE | 195 36 433 A1 | 4/1997 |

OTHER PUBLICATIONS

Japanese Abstract of Document No. JP 0 81 45 7 18 A, Jun. 7, 1996, 1 page.

* cited by examiner

*Primary Examiner*—Walter E. Snow
(74) *Attorney, Agent, or Firm*—Brinks Hofer Gilson & Lione

(57) ABSTRACT

The encoder of the present invention includes at least a pair of giant magnetoresistive effect elements, in which the giant magnetoresistive effect elements to be paired are formed on a substrate in a state that the elements are connected mutually electrically with the orientations of magnetization axes of the pinned magnetic layers each facing the same direction in parallel, a magnetic coding member is rotatably supported to face the giant magnetoresistive effect elements on the substrate, and the magnetic coding member has a plurality of magnetic poles formed along the direction of rotation of itself.

16 Claims, 11 Drawing Sheets

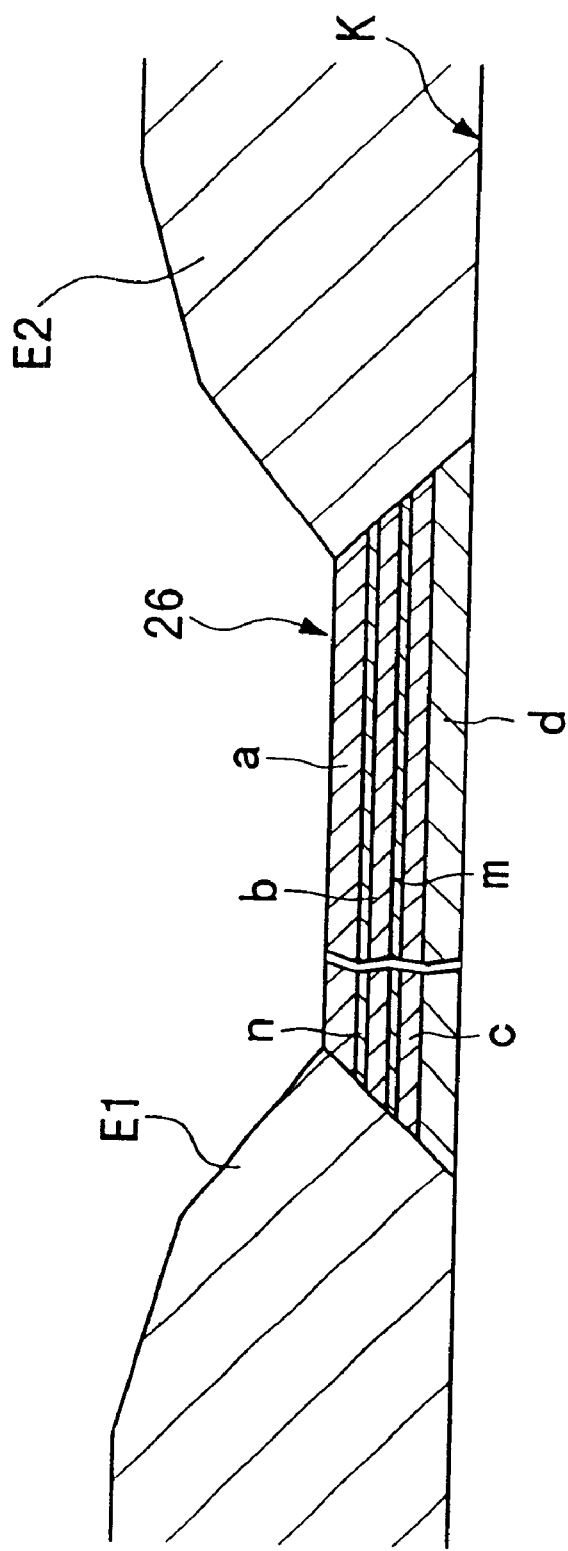

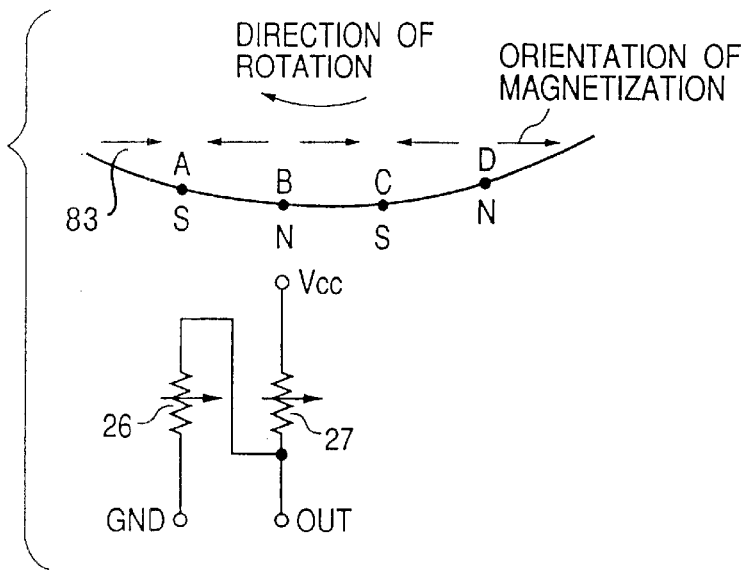
FIG. 7A
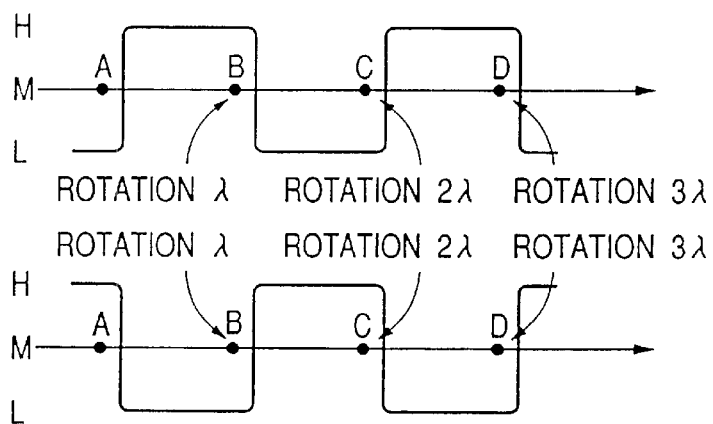
FIG. 7B
FIG. 7C
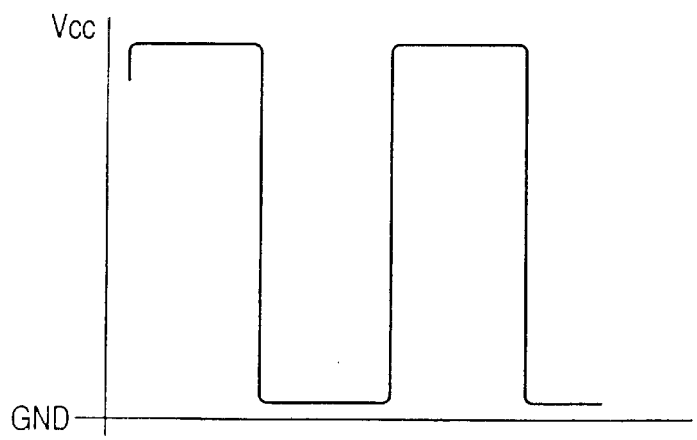
FIG. 7D

ENCODER PROVIDED WITH GIANT MAGNETORESISTIVE EFFECT ELEMENTS

BACKGROUND OF THE INVENTION

1. Field of the Invention

The present invention relates to an encoder provided with giant magnetoresistive effect elements that demonstrate very large resistance variation in response to the variation of external magnetic fields.

2. Related Art

A magnetic field sensor using giant magnetoresistive effect elements is disclosed in, for example, the Japanese Published Unexamined Patent Application No. Hei 8-226960, in which four giant magnetoresistive effect elements are electrically connected in a bridge circuit.

As shown in FIG. 16, a magnetic field sensor A disclosed in this application comprises separately located giant magnetoresistive effect elements 1, 2, 3, 4, in which the giant magnetoresistive effect elements 1, 2 are connected by a lead 5, the giant magnetoresistive effect elements 1, 3 are connected by a lead 6, the giant magnetoresistive effect elements 3, 4 are connected by a lead 7, the giant magnetoresistive effect elements 2, 4 are connected by a lead 8, an input terminal 10 is connected to the lead 6, an input terminal 11 is connected to the lead 8, an output terminal 12 is connected to the lead 5, and an output terminal 13 is connected to the lead 7.

And, the giant magnetoresistive effect elements 1, 2, 3, 4 each assume a sandwich structure in which a non-magnetic layer 15 is interpolated between upper and lower ferromagnetic layers 16, 17, and an antiferromagnetic exchange bias layer 18 is formed on the one ferromagnetic layer (pinned magnetic layer) 16, whereby the exchange coupling generated by this exchange bias layer 18 pins the magnetization axis of the ferromagnetic layer 16 in one direction. Further, the orientation of magnetization axis of the ferromagnetic layer (free magnetic layer) 17 on the other side is made to freely rotate in accordance with the orientation of the external magnetic field; for example, it is made to freely rotate on the horizontal plane including the ferromagnetic layer 17.

Further, in the magnetic field sensor A having the structure shown in FIG. 16, the orientation of magnetization axis of the pinned magnetic layer 16 of the giant magnetoresistive effect element 1 faces forward as shown by the arrow 20 in FIG. 16, the orientation of magnetization axis of the pinned ferromagnetic layer 16 of the giant magnetoresistive effect element 2 faces backward as shown by the arrow 21, the orientation of magnetization axis of the pinned magnetic layer 16 of the giant magnetoresistive effect element 3 faces backward as shown by the arrow 23, and the orientation of magnetization axis of the pinned magnetic layer 16 of the giant magnetoresistive effect element 4 faces forward. And, the orientation of magnetization axis of the free magnetic layer 17 of each of the giant magnetoresistive effect elements 1, 2, 3, 4 faces to the right as shown by the arrow 24 in FIG. 17, in the state that the external magnetic field is not exerted.

In the magnetic field sensor A shown in FIG. 16, when an external magnetic field H is exerted, in the first and fourth giant magnetoresistive effect elements 1, 4, for example, the magnetization axis 24 of the free magnetic layer 17 rotates by a specific angle d as shown in FIG. 17, in accordance with the external magnetic field H; accordingly, the relation of angle to the magnetization axis 20 of the pinned magnetic layer 16 varies to effect a resistance variation. And, since the orientations of magnetization axes of the pinned magnetic layers 16 of the first and fourth giant magnetoresistive effect elements 1, 4 face opposite with the difference of 180° to the orientations of magnetization axes of the pinned magnetic layers 16 of the second and third giant magnetoresistive effect elements 2, 3, the resistance variation involving a phase difference can be acquired.

In the magnetic field sensor A electrically connected in a bridge circuit shown in FIG. 16, the orientations of magnetization axes are specified as shown by each of the arrows, since the differential output has to be obtained from the giant magnetoresistive effect elements 1, 2, 3, 4 when the orientations of magnetization axes of the free magnetic layers 17 vary in response to the external magnetic field H, and in the giant magnetoresistive effect elements 1, 2, 3, 4 located right and left, upper and lower in FIG. 16, the magnetization axes have to be pinned in antiparallel directions such that any two adjacent elements are magnetized in the opposite directions with 180°.

In order to achieve the structure shown in FIG. 16, it is imperative to form the giant magnetoresistive effect elements 1, 2, 3, 4 adjacently on a substrate, and fix the orientations of magnetization axes of the pinned magnetic layers 16 of any adjacent two of giant magnetoresistive effect elements opposite each other with the difference of 180°.

Further, in order to control the orientations of magnetization axes of the pinned magnetic layers 16 of this type, and adjust the lattice magnetization of the exchange bias layer 18, it is imperative to apply a magnetic field of a specific direction to the exchange bias layer 18 while it is heated at a higher temperature than the so-called blocking temperature at which the ferromagnetism disappears, and in addition to conduct a heat treatment to cool while this magnetic field is maintained under application.

However, in the structure shown in FIG. 16, since the orientations of magnetization axes of the exchange bias layers 18 must be shifted by 180° to one another for any two of the giant magnetoresistive effect elements 1, 2, 3, 4, the directions of the magnetic fields must be controlled individually for each of the giant magnetoresistive effect elements adjacently formed on a substrate. Since the method of applying a magnetic field simply from outside by using the magnetic field generator such as an electromagnet or the like allows application of the magnetic field only in one direction, it is very difficult to fabricate the structure shown in FIG. 16, which is a problem.

The technique disclosed in the Japanese Published Unexamined Patent Application No. Hei 8-226960 indicates that the structure shown in FIG. 16 can be achieved by depositing conductive layers individually along each of the giant magnetoresistive effect elements 1, 2, 3, 4 adjacently formed on a substrate, and conducting the foregoing heat treatment by flowing currents in each of these conductive layers in different directions to individually generate magnetic fields of different directions from each of the conductive layers. However, even if it is desired to generate high magnetic fields by applying high currents to the conductive films in order to control the lattice magnetization of the exchange bias layers 18, it is difficult to flow high currents through the thin conductive films that are deposited with the giant magnetoresistive effect elements on the substrate, and difficult to generate the magnetic fields from the conductive films, which are sufficient for the subsequent processes. Further, since the magnetic fields are exerted on the giant magnetoresistive effect elements 1, 2, 3, 4 adjacently formed on a substrate, in each different directions from a plurality of the conductive films, it is extremely difficult to individually apply the high magnetic fields to each of the exchange bias layers 18 of the giant magnetoresistive effect elements 1, 2, 3, 4.

As mentioned above, the magnetic field sensor A shown in FIG. 16 possesses an excellent function as a magnetic sensor; however in reality, to form the films on a substrate and fabricate the magnetic field sensor A involves extremely delicate processes to apply the magnetic fields and heat processes, making the fabrication difficult, and the structure causes a problem for a wider applications.

Further, as to the applications of the magnetic field sensor A shown in FIG. 16, the Japanese Published Unexamined Patent Application No. Hei 8-226960 only suggests the applications to linear and rotary encoders, proximity sensors, geomagnetic magnetometers, and the like. And, there are not any concrete suggestions as to which equipment and fields the structure of the magnetic field sensor A is to be applied to.

On the other hand, as an example of products applying the magnetism, a magnetic encoder is well known. The encoder of this type uses the Hall elements as the detecting elements responsive to the variation of the magnetic field, however the output waveform before processing, namely the waveform generated by the Hall elements, is approximately the sine curve. A drift of unbalanced voltage of the Hall elements, or a drift of input offset voltage of an amplifier, deteriorates both the duty (ratio between low and high) of a rectangular wave obtained, and the phase difference between A and B phases, which are the problems. In addition, the output waveform generated from the Hall elements is low and easy to be influenced by these factors. Accordingly, the use of the Hall element has made it difficult to acquire a highly precise signal. Therefore, it has been eagerly sought to achieve an encoder that possesses detecting elements to generate a high output with a waveform approximate to the rectangular wave and generates a highly precise signal.

SUMMARY OF THE INVENTION

In view of the foregoing circumstances, the present invention has been made through trials to employ the giant magnetoresistive effect elements, which is based on a novel idea unlike the conventional magnetic field sensor. It is therefore an object of the present invention to provide an encoder that detects the angle of rotation of a magnetic coding member and obtains a higher output by adopting a unique structure using the giant magnetoresistive effect elements.

In order to accomplish the foregoing objects, the encoder of the present invention comprises at least a pair of giant magnetoresistive effect elements that contain at least exchange bias layers, pinned magnetic layers whose orientations of magnetization axes are fixed in one direction by the exchange bias layers, non-magnetic layers, and free magnetic layers whose orientations of magnetization axes are freely rotated by an external magnetic field. And, the giant magnetoresistive effect elements to be paired are formed on a substrate in a state that the elements are connected mutually electrically with the orientations of magnetization axes of the pinned magnetic layers each facing the same direction in parallel, and a magnetic coding member is rotatably supported to face the giant magnetoresistive effect elements on the substrate, and the magnetic coding member is provided with a plurality of magnetic poles formed along the direction of rotation of itself.

The encoder of the present invention may take on a construction such that an output terminal is formed on a part that connects one end of one of the giant magnetoresistive effect elements to be paired to one end of another, and input terminals are each formed on the other end of one giant magnetoresistive effect element and on the other end of the other giant magnetoresistive effect element.

The encoder of the present invention may take on another construction such that the magnetic coding member is formed in a disc-shape, a plurality of different magnetic poles are alternately formed with a specific pitch on the periphery of the magnetic coding member, and the magnetic coding member is supported to freely rotate with a specific gap detached from the substrate, in a state that the periphery of the magnetic coding member faces the giant magnetoresistive effect elements.

The encoder of the present invention preferably has a construction such that a gap between the giant magnetoresistive effect elements to be paired has a relation that satisfies an expression of $2n\lambda+\lambda$, when the polarization pitch on the magnetic coding member is represented by $\lambda$ and the integer by n.

Further, the encoder of the present invention preferably has a construction such that a first, a second, a third, and a fourth giant magnetoresistive effect elements are formed in a line on the substrate in parallel to each other with a specific gap detached from each other, and the gap between the giant magnetoresistive effect elements has a relation that satisfies the expression of $2n\lambda+\lambda$, when the polarization pitch (distance between the N pole and S pole) on the magnetic coding member is represented by $\lambda$ and the integer by n.

Further, the encoder of the present invention may take on another construction such that, of parts to connect the first, second, third, and fourth giant magnetoresistive effect elements, two parts have input terminals formed thereon, and the remaining two have output terminals formed thereon.

BRIEF DESCRIPTION OF THE DRAWINGS

FIG. 5 is a sectional view to illustrate the lamination structure and connection parts in the giant magnetoresistive effect element applied to the rotary encoder of which the basic structure is shown in FIG. 3;

FIG. 7A is a chart to illustrate the positional relation of the magnetic coding member and the giant magnetoresistive effect elements, FIG. 7B is a chart to illustrate the resistance variation of the giant magnetoresistive effect element, FIG. 7C is a chart to illustrate the resistance variation of the other giant magnetoresistive effect element, and FIG. 7D is a chart to illustrate an output waveform;

DESCRIPTION OF THE PREFERRED EMBODIMENTS

The first embodiment of an encoder of the present invention will be described with reference to the accompanying drawings.

Figure 1:
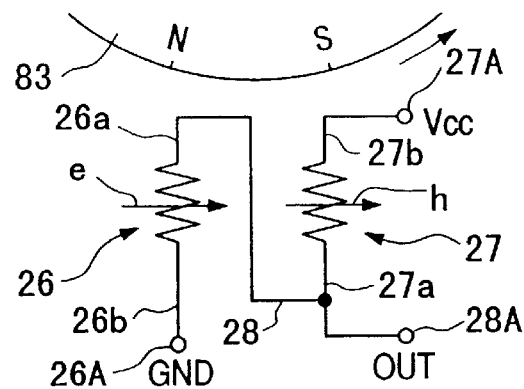
FIG. 1 is a circuit diagram to illustrate a connection structure of the giant magnetoresistive effect elements provided in the rotary encoder relating to the present invention.
Figure 2:
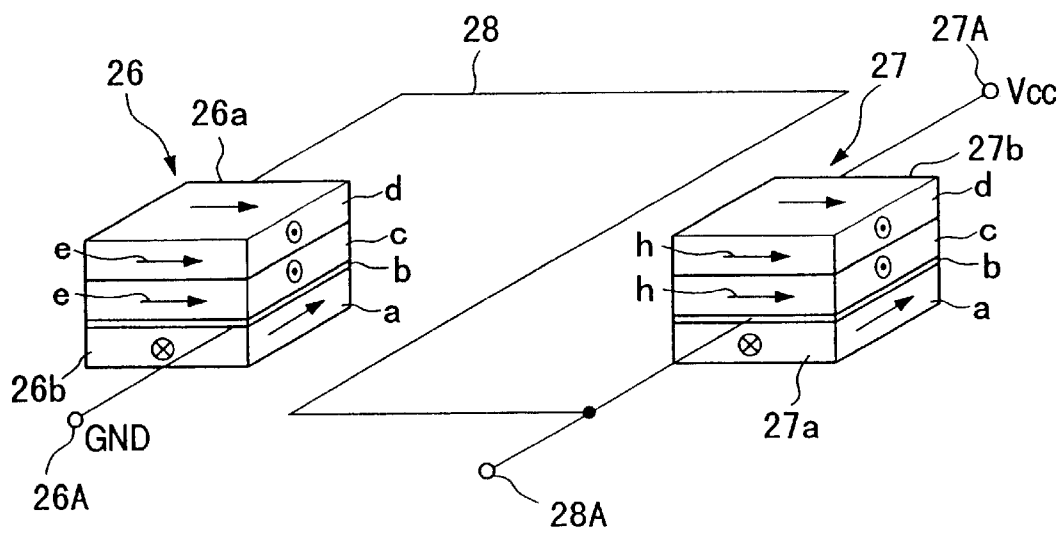
FIG. 2 is a constructional chart to illustrate the basic structure and connection of the giant magnetoresistive effect elements shown in FIG. 1.
Figure 3:
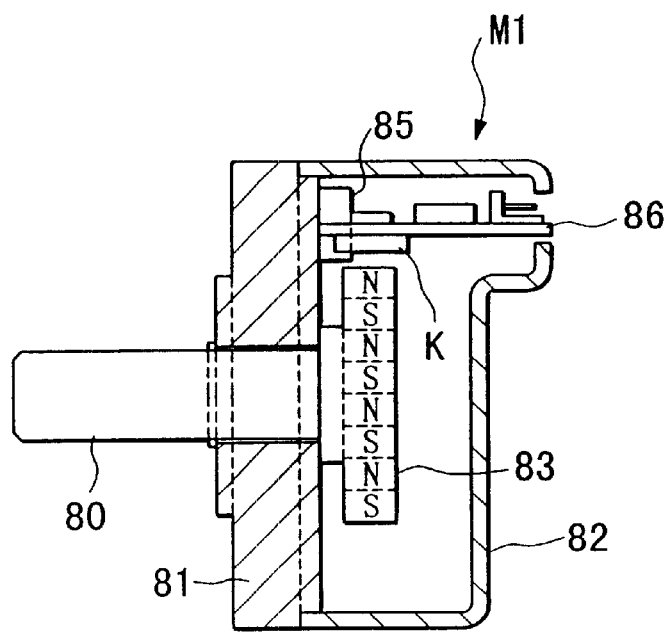
FIG. 3 is a sectional view of the rotary encoder relating to the first embodiment, incorporating a substrate on which the giant magnetoresistive effect elements shown in FIG. 1 are formed.

FIG. 1 illustrates a connection of the giant magnetoresistive effect elements provided in the encoder of the first embodiment, and a circuit diagram of the configuration of a magnetic coding member that faces them, FIG. 2 illustrates a lamination structure and connection of the giant magnetoresistive effect elements, and FIG. 3 illustrates a sectional structure of the encoder of the first embodiment.

In the circuit shown in FIG. 1, ends 26a, 27a of the giant magnetoresistive effect elements 26, 27 that vary electric resistances in response to an external magnetic field are connected by a conductor 28, an output terminal 28A is formed on the conductor 28 of the connected area, an input terminal 26A is formed on the other end 26b of the giant magnetoresistive effect element 26, a power supply terminal 27A is formed on the other end 27b of the giant magnetoresistive effect element 27. In other words, the circuit structure shown in FIG. 1 is composed of an intermediate point of connecting the giant magnetoresistive effect elements 26, 27 in series, the output terminal on one end, and the input terminal on the other end.

In practice, the circuit shown in FIG. 1 is formed on one plane of a substrate K incorporated into an encoder M1 shown in FIG. 3, the giant magnetoresistive effect element 26 and the giant magnetoresistive effect element 27 are disposed in parallel with a specific distance detached, and the orientations e, h of magnetization axes of the pinned magnetic layers to be described later which are formed on the giant magnetoresistive effect elements 26, 27 are set to face to one direction.

The encoder M1 shown in FIG. 3 is composed of a rotary spindle 80, a disk bearing member 81 that supports this rotary spindle 80 about the axis to freely rotate, a cap-shape covering member 82 mounted on the rear of this bearing member 81, a magnetic coding member 83 installed on the rear of the bearing member 81 which is covered with this covering member 82, and a substrate K. The bearing member 81 is formed of, for example, a brass disk member, and the covering member 82 is formed by drawing, for example, a metal plate.

The rotary spindle 80 is made of a non-magnetic material such as a resin or non-magnetic stainless steel, a part of one end of the rotary spindle 80 is thrust through the bearing member 81 to project out on the rear side, and on the one end, the magnetic coding member 83 is attached perpendicularly to the rotary spindle 80. The magnetic coding member 83 is made up with a plurality of magnets such that S poles and N poles thereof are alternately disposed to form a line along the periphery. And, the rotary spindle 80 may be made of a soft magnetic substance such as iron, or a ferromagnetic substance if it is sufficiently detached from the magnetic coding member 83 and the giant magnetoresistive effect elements 26, 27.

Therefore, the magnetic coding member 83 has a plurality of magnetic poles formed along the circumference thereof.

A mounting board 86 is attached in parallel to the rotary spindle 80, which is supported by a holder member 85 on the rear side of the bearing member 81. The substrate K is mounted on the side facing to the magnetic coding member 83 of the mounting board 86. On one side of the substrate K, the giant magnetoresistive effect elements 26, 27 shown in FIG. 1 are formed, and they are fixed on the mounting board 86 so as to face the circumference of the magnetic coding member 83 with a specific gap G.

And, the distance (gap G) between the circumference of the magnetic coding member 83 and the substrate K is specified as a distance such that the magnetic field generated by the magnetic coding member 83 is satisfactorily acted on the giant magnetoresistive effect elements 26, 27, which is normally within about 0.2 mm to 0.7 mm, for example, 0.5 mm. If the gap G is less than λ, the generated waveform will become a rectangular waveform.

FIG. 2 clarifies a concrete lamination structure of the giant magnetoresistive effect elements 26, 27 of this embodiment, and the orientations of magnetization axes of these layers, in which the giant magnetoresistive effect elements 26, 27 each are made equal in terms of structure, and each of them comprises a ferromagnetic layer (free magnetic layer) a, non-magnetic layer b, ferromagnetic layer (pinned magnetic layer) c, and exchange bias layer (antiferromagnetic layer) d which are deposited in lamination, basically as shown in FIG. 2. And, the giant magnetoresistive effect elements 26, 27 are preferably formed to be linearly slender in the plan view. Therefore, in case of the connection circuit shown in FIG. 1, the giant magnetoresistive effect elements 26, 27 are preferably disposed to be linearly slender in a longitudinal direction (the vertical direction in FIG. 1).

In the lamination structure shown in FIG. 2, the pinned magnetic layers c adjacent to the exchange bias layers d are pinned in terms of the orientations of magnetization axes by the exchange bias layers d. Concretely, in the giant magnetoresistive effect element 26, the orientations of magnetization axes of the exchange bias layer d and the pinned magnetic layer c are set to the right as shown by the arrow e; and in the giant magnetoresistive effect element 27, the orientations of magnetization axes of the exchange bias layer d and the pinned magnetic layer c are set to the right as shown by the arrow h. Accordingly, the orientations of magnetization axes of the pinned magnetic layers c of the giant magnetoresistive effect elements 26, 27 face to one direction.

FIG. 5 illustrates an example of a detailed structure in which the layers are individually deposited on the substrate K to form the giant magnetoresistive effect element 26.

The giant magnetoresistive effect element 26 in this example is formed in an equal leg trapezoid, in which the exchange bias layer d, pinned magnetic layer c, subferromagnetic layer m, non-magnetic layer b, subferromagnetic layer n, and free magnetic layer a are deposited in lamination on the substrate K in this order from the bottom. On both sides of these laminates, conductors E1, E2 are formed so as to come in contact with these layers. These conductors E1, E2 are the conductors that electrically connect the giant magnetoresistive effect elements each other.

In the structure in FIG. 5, the subferromagnetic layers m and n are provided in order to effectively demonstrate the magnetoresistive effect, which are formed of ferromagnetic substances such as Co, Co alloy, or the like; however, these subferromagnetic layers may be omitted. Further, the exchange bias layer d, pinned magnetic layer c, subferromagnetic layer m, non-magnetic layer b, subferromagnetic layer n, and free magnetic layer a may be deposited in lamination in the order opposite to this example.

Further, a more concrete lamination structure of the giant magnetoresistive effect element comprises, for example, $\alpha$-$Fe_2O_3$ layer (exchange bias layer)/NiFe layer (pinned magnetic layer)/Co layer (subferromagnetic layer)/Cu layer (non-magnetic layer)/Co layer (subferromagnetic layer)/NiFe layer (free magnetic layer). And, an $Al_2O_3$ layer as a current shunting layer may be formed under the $\alpha$-$Fe_2O_3$ layer as needed. In addition to the foregoing structures, a giant magnetoresistive effect element having a lamination structure of $\alpha$-$Fe_2O_3$ layer/Co layer/Cu layer/Co layer/NiFe layer/Co layer/Cu layer/Co layer/$\alpha$-$Fe_2O_3$ layer can be cited. Further, the exchange bias layer may use any of well-known ones as long as the orientation of magnetization axis of the pinned magnetic layer adjacent to the exchange bias layer can be pinned; and FeMn layer, NiMn layer, NiO layer, IrMn layer, CrPtMn layer, PdPtMn layer, MnRhRu layer, and PtMn layer, etc., may be used in addition to the $\alpha$-$Fe_2O_3$ layer.

Next, in the example shown in FIG. 1, the pitch (gap between the N pole and S pole: $\lambda$) of polarization is specified as virtually equal to the gap D between the giant magnetoresistive effect elements 26, 27. It is preferable that the relation of the pitch (1) of polarization with the gap D between the giant magnetoresistive effect elements 26, 27 is determined by the following equation (1).

$$D=2n\lambda+\lambda \text{ (here, n=0 and integer)} \quad (1)$$

Further, the relation of the pitch (1) of polarization with the gap D may not necessarily satisfy the equation (1) perfectly, and may deviate within about 20%

Figure 14:
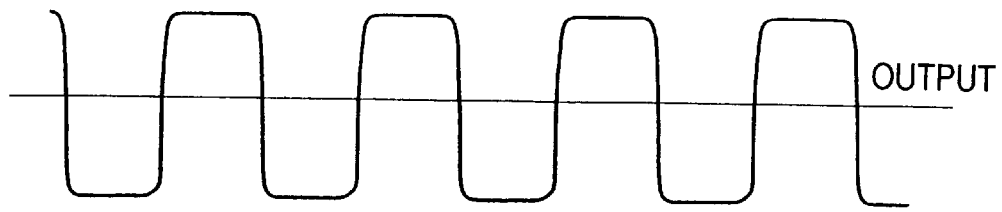
FIG. 14 is a chart to illustrate the first example of the output waveform obtained by the encoder of the example.

In the rotary encoder M1 having the structure shown in FIG. 1 through FIG. 4, when the rotary spindle 80 is rotated and a voltage is applied to the circuit from the input terminal 27, if a voltage between the output terminal 28A and the ground terminal 26A is measured, the electric resistance of a pair of the giant magnetoresistive effect elements 26, 27 varies by the action of the magnetic field, the voltage variation of the middle point generated in accordance with the resistance variation can be measured. The waveform obtained approximates a rectangular waveform as shown in FIG. 14, to which the A/D conversion is applied to transform it into a rectangular waveform, and thereby the angle of rotation of the rotary spindle 80 is detected and the circuit structure can be used as the rotary encoder.

Further, since the structure uses the giant magnetoresistive effect elements 26, 27, the encoder can use a wide variation of resistance for detection; in consequence, it can obtain a high output of a rectangular waveform.

Figure 6A:
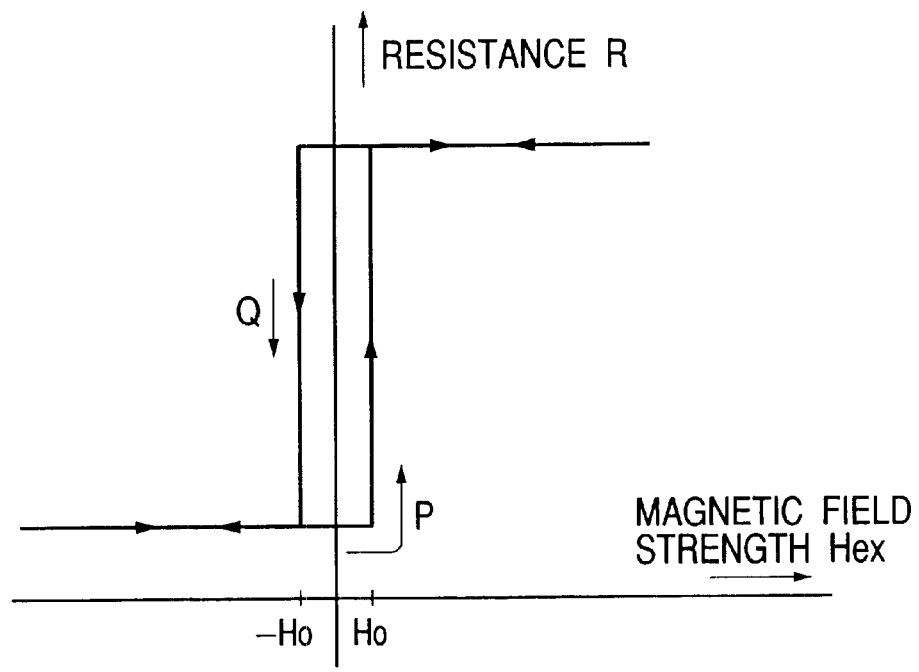
FIG. 6A is a chart to explain the resistance variation of a giant magnetoresistive effect element.

FIG. 6A illustrates the variation of resistance of the concerned giant magnetoresistive effect element, when a magnetic field is applied to the magnetoresistive effect elements used for the rotary encoder of the foregoing structure in the direction perpendicular to the one in which they are formed, namely, in the magnetization orientation of the pinned magnetic layer. Here, the magnetization orientation of the pinned magnetic layer is shown on the minus side of the magnetic field strength, and the opposite direction in which the magnetic field is applied is shown on the plus side of the magnetic field strength.

Figure 6B:
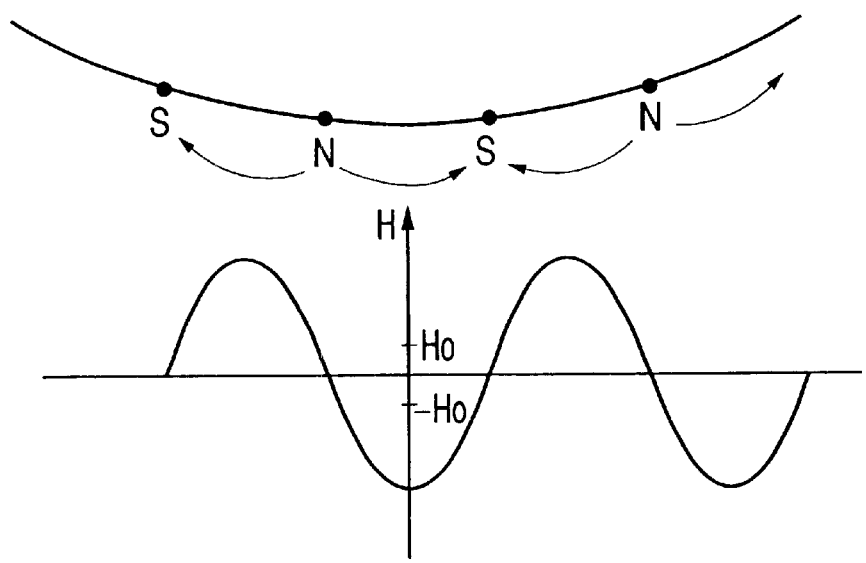
FIG. 6B is a chart to illustrate the output wave in relation to the position of the N pole and S pole on the magnetic coding member.

FIG. 6B illustrates, in the layout of the magnetoresistive effect elements, a distribution of the magnetic field strength by the magnetic coding member perpendicular to the direction in which the concerned magnetoresistive effect element is formed, and shows the values of the magnetic field strength of H0, -H0 in FIG. 6A.

FIG. 7A illustrates the relation of position between the magnetic coding member 83 and the giant magnetoresistive effect elements 26, 27; FIG. 7B illustrates the resistance of the giant magnetoresistive effect element 26 when the magnetic coding member rotates; FIG. 7C illustrates the resistance of the giant magnetoresistive effect element 27; and FIG. 7D illustrates the output of the encoder.

Figure 4:
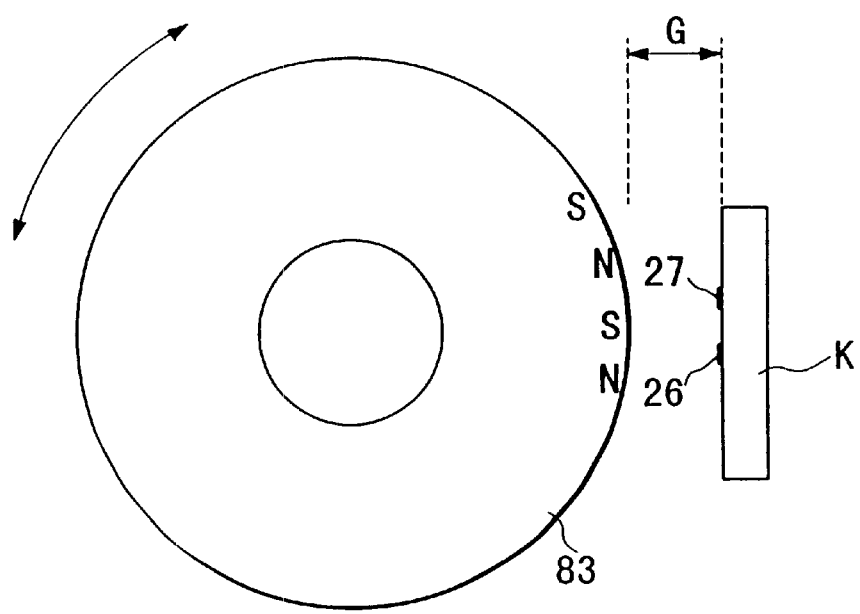
FIG. 4 is a chart to illustrate the configuration of the magnetic coding member and the substrate.

The reason why the output shown in FIG. 7D is obtained will now be detailed. Since the giant magnetoresistive effect elements 26, 27 are faced to the magnetic coding member 83 as shown in FIG. 4 and disposed perpendicularly to the direction of rotation, the magnetic field applied to the concerned giant magnetoresistive effect element can be considered as the vector sum of magnetic fields in the film thickness direction and the magnetization orientation of the pinned magnetic layer. Here, since the magnetic field components in the film thickness direction of the concerned giant magnetoresistive effect elements 26, 27 give virtually no influence to the output, they can be neglected. Therefore, the magnetic field relating to the output of the concerned giant magnetoresistive effect elements 26, 27 can be considered as the magnetic component shown in FIG. 6B.

In view of this, first in an area where the giant magnetoresistive effect element 26 faces to the point A of the magnetic coding member 83 in FIG. 7A, the field strength increases from -H0 to +H0, as clearly shown in FIG. 6B. Referring to FIG. 6A, since the resistance shows the characteristic P, the resistance rises from L to H at a slightly dislocated position from the point A.

Next, in an area where the giant magnetoresistive effect element 26 faces to the point B as the magnetic coding member 83 rotates clockwise, the magnetic field strength decreases from +H0 to -H0, as clearly shown in FIG. 6B. Since the resistance shows the characteristic Q, referring to FIG. 6A, the resistance falls from H to L at a slightly dislocated position from the point B.

In the same manner, the points C, D also show the same, which effects the variation of resistance shown in FIG. 7B. Further, the giant magnetoresistive effect elements 26, 27 are formed in such a manner that the values of +H0 and −H0 become extremely low.

With regard to the giant magnetoresistive effect element 27, the variation of resistance shown in FIG. 7C is produced for the same reason, as the magnetic coding member 83 rotates.

Here, the output is expressed by "supply voltage× resistance of the giant magnetoresistive effect element 26/ (resistance of giant magnetoresistive effect element 26+the resistance of giant magnetoresistive effect element 27)". Since the giant magnetoresistive effect elements 26, 27 are disposed with the gap λ, the value of the denominator can be regarded as almost constant, and the output shown in FIG. 7D can be acquired. Further, the output being expressed by the above equation, it is possible to approximate the value of High to the supply voltage and the value of Low to the ground potential, as compared to the case where one of the two is configured with a constant resister.

Figure 8:
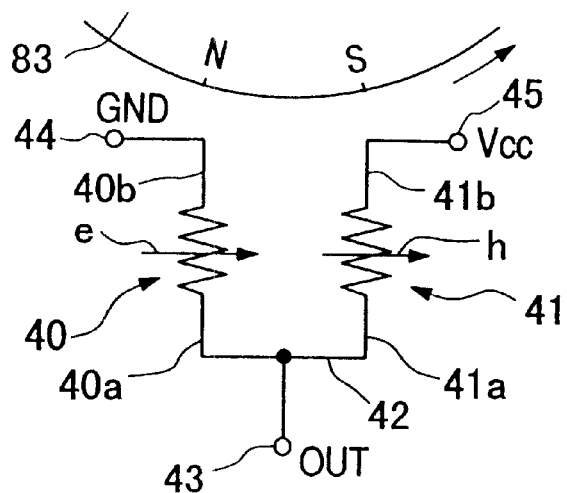
FIG. 8 is a circuit diagram to illustrate a connection structure of the giant magnetoresistive effect elements provided in the rotary encoder relating to the second embodiment of the present invention.

FIG. 8 illustrates the circuit configuration of giant magnetoresistive effect elements used for the rotary encoder of the second embodiment. In this circuit configuration, the giant magnetoresistive effect elements 40, 41 are formed on the substrate K shown in FIG. 3 in the same manner as the first embodiment; however, the configuration of these elements is different in part.

One end 41a of the giant magnetoresistive effect element 41 is connected to one end 40a of the giant magnetoresistive effect element 40 through a conductor 42, an output terminal 43 is formed on the conductor 42, a ground terminal 44 is formed on the other end 40b of the giant magnetoresistive effect element 40, and a power supply terminal 45 is formed on the other terminal 41b of the giant magnetoresistive effect element 41.

The circuit structure shown in FIG. 8 is equal to that shown in FIG. 1 in that the output is obtained from the center point of the giant magnetoresistive effect elements to be paired; accordingly, the circuit structure shown in FIG. 8 also achieves the same effect as the encoder as in the foregoing second embodiment.

Figure 9:
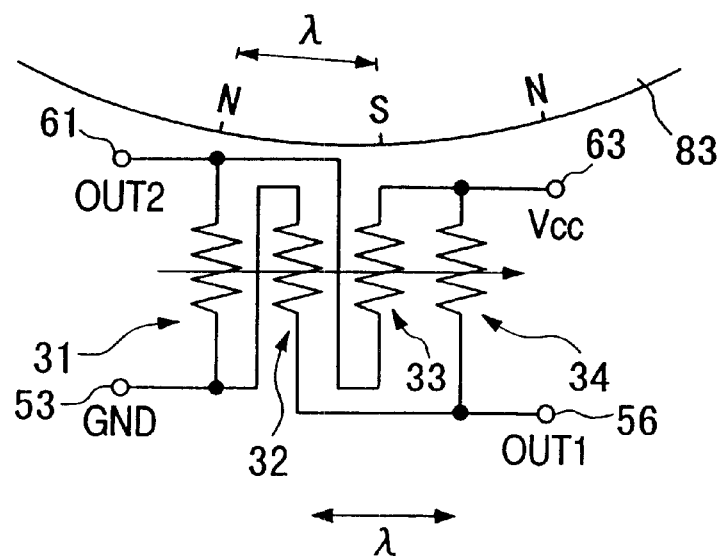
FIG. 9 is a circuit diagram to illustrate a connection structure of the giant magnetoresistive effect elements provided in the rotary encoder relating to the third embodiment of the present invention.
Figure 10:
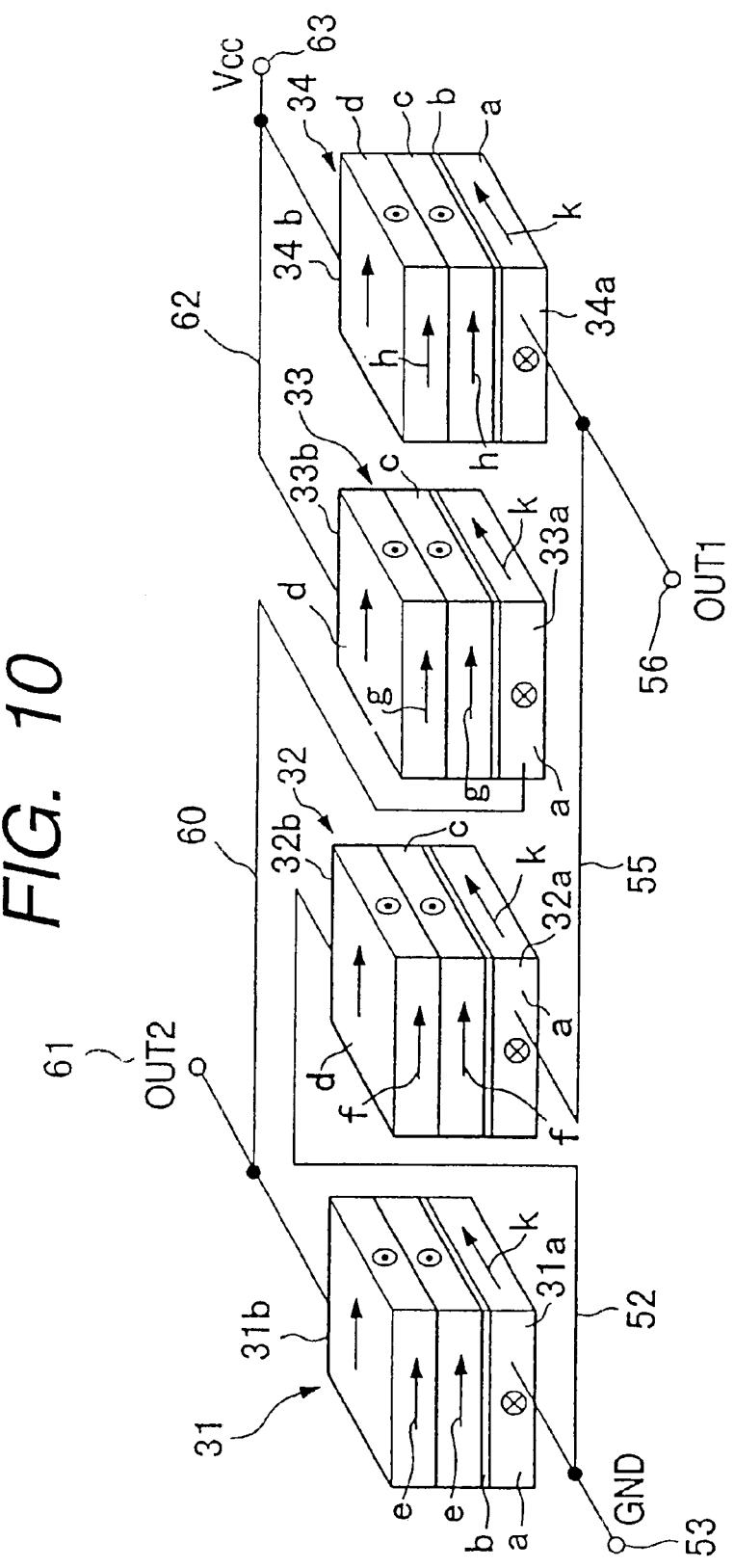
FIG. 10 is a chart to illustrate the basic lamination structure and circuit configuration of the giant magnetoresistive effect elements relating to the third embodiment.
Figure 11:
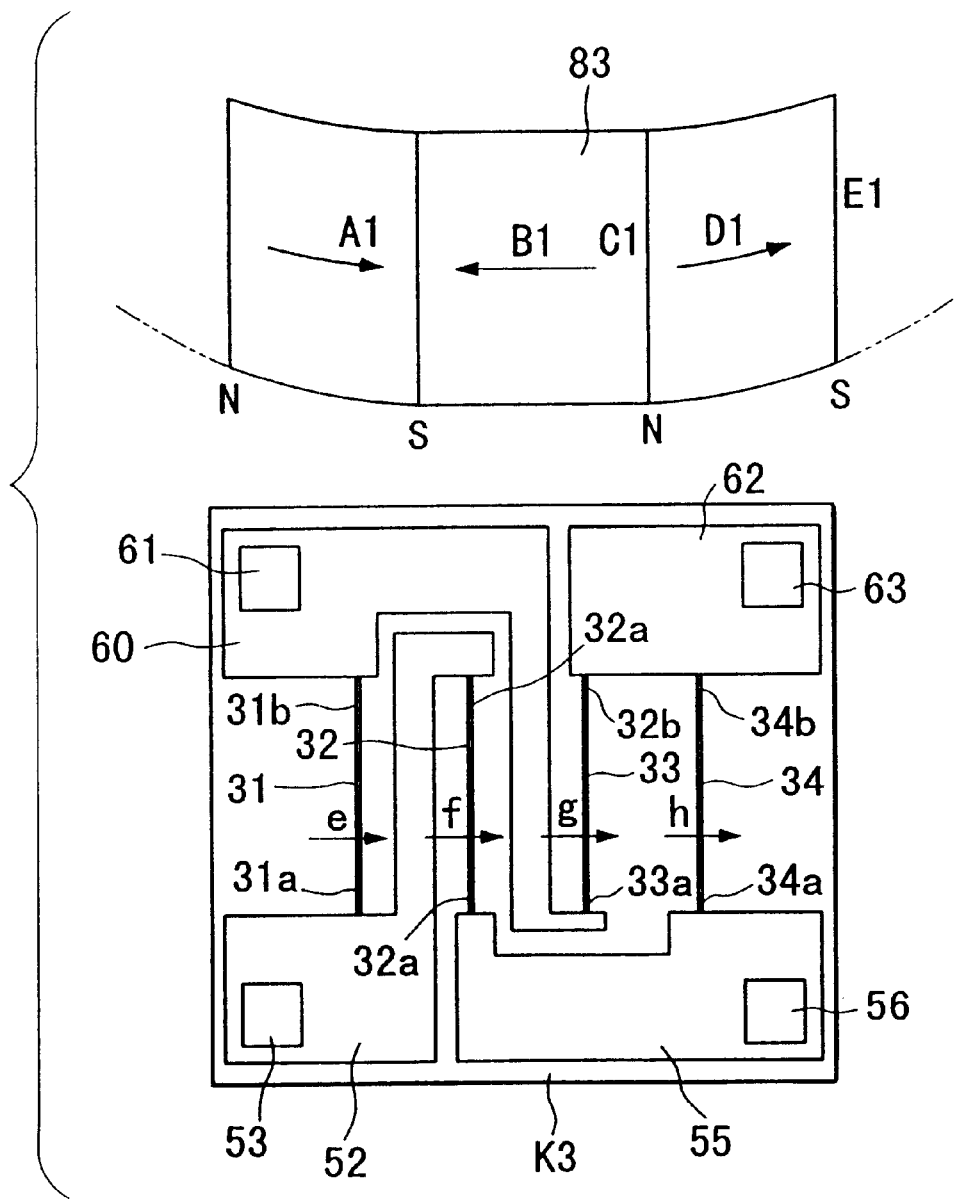
FIG. 11 is a chart to explain the positional relation of the substrate and the magnetic coding member which are provided in the rotary encoder of the third embodiment.

FIG. 9 illustrates a circuit structure of the giant magnetoresistive effect elements used for the rotary encoder of the third embodiment relating to the present invention, FIG. 10 is a schematic construction chart to illustrate the basic concept of the circuit, and FIG. 11 is a plan view to illustrate one example of a structure in which the giant magnetoresistive effect elements are formed on a practical substrate K3.

The substrate K3 provided in the encoder of the third embodiment contains a first giant magnetoresistive effect element 31, a second giant magnetoresistive effect element 32, a third giant magnetoresistive effect element 33, and a fourth giant magnetoresistive effect element 34 which are disposed in this order from left to right in FIG. 10.

All of these giant magnetoresistive effect elements 31, 32, 33, 34 are made of a thin film laminate, as will be described later, and are formed in a linear slenderness.

FIG. 10 clarifies a concrete lamination structure of the giant magnetoresistive effect elements 31, 32, 33, 34 of this embodiment, and the orientations of magnetization axes of these layers, in which the giant magnetoresistive effect elements 31, 32, 33, 34 each are made equal in terms of structure, and each of them comprises a ferromagnetic layer (free magnetic layer) a, non-magnetic layer b, ferromagnetic layer (pinned magnetic layer) c, and exchange bias layer d which are deposited in lamination, basically as shown in FIG. 10.

In the lamination structure shown in FIG. 10, in the first giant magnetoresistive effect element 31, 32, 33, 34, the orientations of magnetization axes of the exchange bias layers d and the pinned magnetic layers c are set to the right as shown by the arrows e, f, g, and h.

Further, the magnetization axes of the free magnetic layers a of the first, second, third, fourth giant magnetoresistive effect elements 31, 32, 33, 34 face backward in FIG. 10, namely, to the directions of the arrows k perpendicular to each of the orientations of magnetization axes of the pinned magnetic layers c in the state that the external magnetic field is not applied.

Next, one side 31a of the first giant magnetoresistive effect element 31 is connected to the other side 32b of the second giant magnetoresistive effect element 32 through a conductor 52, which constitutes a connection part, and an output terminal 53 is connected to the conductor 52. And, in the same manner, one side 32a of the second giant magnetoresistive effect element 32 is connected to one side 34a of the fourth giant magnetoresistive effect element 34 through a conductor 55, which constitutes a connection part, and an output terminal 56 is connected to the conductor 55. Further, the other side 31b of the first giant magnetoresistive effect element 31 is connected to one side 33a of the third giant magnetoresistive effect element 33 through a conductor 60, which constitutes a connection part, and an output terminal 61 is connected to the conductor 60. And, in the same manner, the other side 33b of the third giant magnetoresistive effect element 33 is connected to the other side 34b of the fourth giant magnetoresistive effect element 34 through a conductor 62, which constitutes a connection part, and an input terminal 63 is connected to the conductor 62.

FIG. 11 illustrates an example of a structure in which the giant magnetoresistive effect elements 31, 32, 33, 34 of the basic structure shown in FIG. 9 and FIG. 10, the conductors 52, 55, 60, 62 made of a conductive metal material such as Cr, Cu, or the like, and the terminals 53, 56, 61, 63 are deposited in lamination practically on the substrate K3.

In this structure, the substrate K3 is made of a non-magnetic insulating material such as a silicon substrate or the like. Normally, a substrate film made of $Al_2O_3$, etc., is preferably overlaid on the upper side of the substrate K3 in pursuit for flatness or improvement of insulation.

The encoder shown in FIG. 11 obtains a two-phase output with such a circuit configuration that a pair of giant magnetoresistive effect elements in the first embodiment shown in FIG. 1 are additionally provided and disposed in parallel to be mutually detached with half the gap D (see equation (1)). The basic operational theory is the same as the one described with FIG. 6 and FIG. 7, and the detailed description will be omitted. Regarding the outline of operation, when the point A1 (center point of the S pole) of the magnetic coding member 83 rotates to take the position just above the giant magnetoresistive effect element 32, a magnetic field facing right is exerted on the giant magnetoresistive effect element 31, and a magnetic field facing left is exerted on the giant magnetoresistive effect element 33.

Here, since the orientation of magnetization axis of the pinned magnetic layer c is faced right and in the same direction as that of the magnetic field acted on the giant magnetoresistive effect element 31, the resistance shows the minimum value as previously explained. Since the magnetic field facing left is acted on the giant magnetoresistive effect element 33, the resistance shows the maximum value. Accordingly, if 5 volts are applied, for example, the output from the terminal 61 being the center point of the giant magnetoresistive effect elements 31, 33 becomes less than 2.5 volts, from the relation (output from the giant magnetoresistive effect element 31)>(output from the giant magnetoresistive effect element 33).

Next, when the point C1 comes to the position above the giant magnetoresistive effect element 32, the magnetic field facing opposite to the foregoing case is acted, and the output from the center terminal 61 becomes more than 2.5 volts, from the relation (output from the giant magnetoresistive effect element 31)>(output from the giant magnetoresistive effect element 33).

Table 1 arranges all these output states of the points on the magnetic coding member and the giant magnetoresistive effect elements 31, 32, 33, 34.

TABLE 1

| magnetic coding member position above element 32 | resistance (L: minimum, M: median, H: maximum) | | | |
|---|---|---|---|---|
| | element 31 | element 32 | element 33 | element 34 |
| around point A1 | L | M | H | M |
| around point B1 | M | H | M | L |
| around point C1 | H | M | L | M |
| around point D1 | M | L | M | H |
| around point E1 | L | M | H | M |

If the relation of the above Table 1 is satisfied, the center point connected in series produces two output waveforms with phase ½ shifted, which approximate the rectangular wave, as shown in FIG. 7D. And, the waveforms each are shaped to acquire rectangular waves, both of which are compared. The comparison of the rise timing of one rectangular wave against the rise timing of the other rectangular wave enables to detect the direction of rotation of the magnetic coding member.

Figure 12:
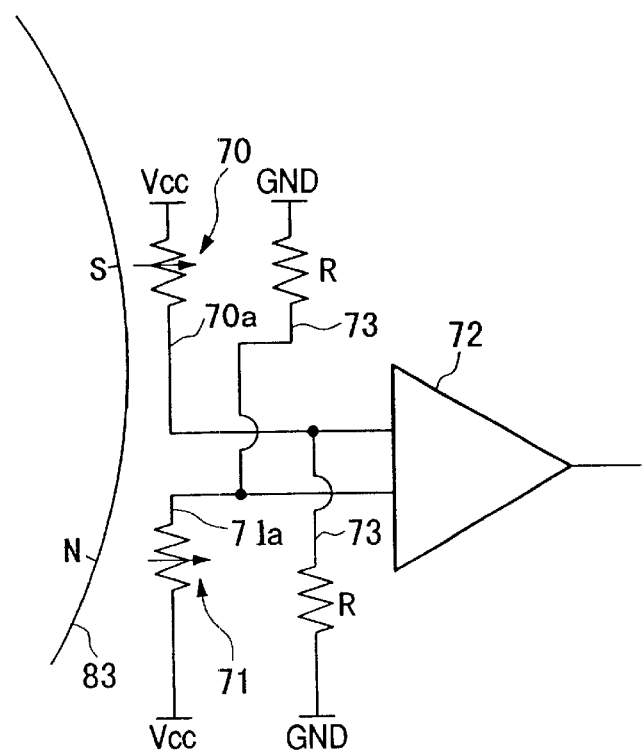
FIG. 12 is a chart to illustrate a connection structure of the giant magnetoresistive effect elements provided in the rotary encoder relating to the fourth embodiment of the present invention.

FIG. 12 illustrates a major part of the fourth embodiment of the rotary encoder relating to the present invention. The rotary encoder of this embodiment includes giant magnetoresistive effect elements 70, 71, which are disposed in parallel and in the same direction to the orientations of magnetization axes of the pinned magnetic layers and arranged with the same gap as the polarization pitch of the magnetic coding member 83, an amplifier 72 connected to ends 70a, 71a of the giant magnetoresistive effect elements 70, 71, earth lines 73 provided with fixed resisters R, and input terminals formed on the other ends of the giant magnetoresistive effect elements 70, 71, whereby the encoder is able to amplify the differential output from the giant magnetoresistive effect elements 70, 71.

Since the rotary encoder of the construction shown in FIG. 12 obtains the differential output from the giant magnetoresistive effect elements 70, 71, the rotary encoder is able to detect the state of rotation of the magnetic coding member 83 in the same manner as the rotary encoder in FIG. 1 or FIG. 9. Further, the circuit structure with the differential amplifier shown in FIG. 12 will produce an amplified output.

Next, the method of pinning the magnetization axes of the pinned magnetic layers c in the giant magnetoresistive effect elements on the substrate K3 used in the third embodiment will now be described.

Figure 13:
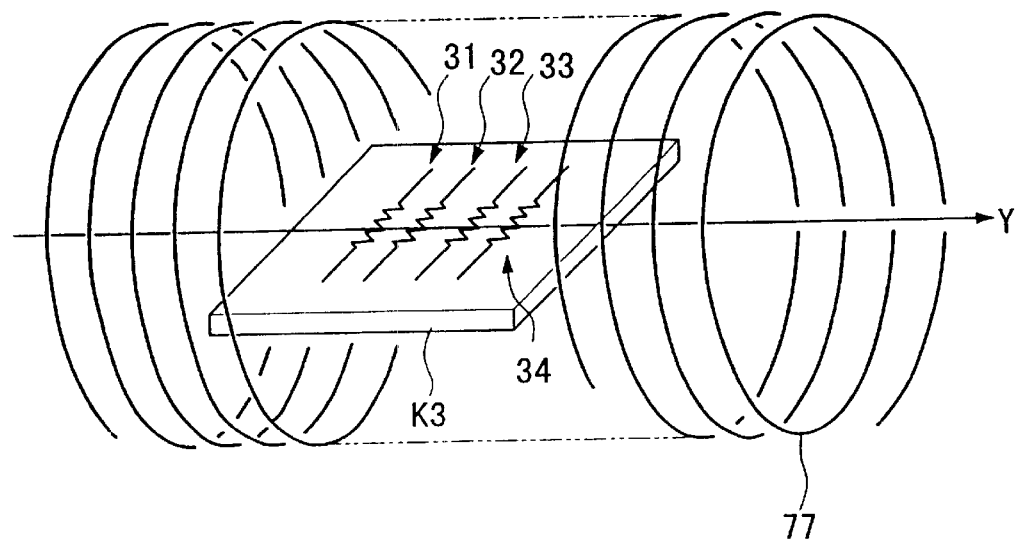
FIG. 13 is a chart to illustrate a state in which the exchange bias layers of the giant magnetoresistive effect elements shown in FIG. 11 are polarized.

To pin the orientations of the magnetization axes of the pinned magnetic layers c has only to be polarized in a specific direction the exchange bias layers d made of, for example, $\alpha\text{-}Fe_2O_3$. In order to carry this out, a hollow coil 77 is employed which is formed of a conductor having a size such that the substrate K3 can freely pass through inside thereof, as shown in FIG. 13. And, the substrate K3 is set in the center of the hollow coil 77, the longitudinal direction of the giant magnetoresistive effect elements 31, 32, 33, 34 on the substrate K3 is set perpendicular to the longitudinal direction of the hollow coil 77, and in this state, a current is flown through the hollow coil 77. Then, a uniform magnetic field is generated in the direction shown by the arrow Y in FIG. 13, so that the exchange bias layers d can be polarized in one direction.

Incidentally, when the exchange bias layers d are made of $\alpha\text{-}Fe_2O_3$, NiO, IrMn, CrPtMn, the exchange bias layers d can be polarized instantly by such means of applying magnetic fields. However, when NiMn, PdPtMn, MnRhRu, and PtMn are selected as the constructional materials of the exchange bias layers d, since the exchange bias layers d have to be polarized as mentioned above, after heated to a higher temperature than the blocking temperature, polarizing work becomes complicated, however naturally these materials can be applied to the present invention as they can be polarized.

Embodiments

A substrate of the basic structure was formed in such a manner that four linear giant magnetoresistive effect elements of 0.05 mm wide and 1.5 mm long were formed on a silicon substrate of 3.6 mm long, 3.6 mm wide, and 0.5 mm thick, to be disposed in parallel each other as shown in FIG. 8.

Each of the giant magnetoresistive effect elements on the substrate was formed in an eight-layered lamination structure of $Al_2O_3$ layer (1000 Å thick)/$\alpha\text{-}Fe_2O_3$ layer (1000 Å thick)/NiFe layer (30 Å thick)/Co layer (10 Å thick)/Cu layer (22 Å thick)/Co layer (10 Å thick)/NiFe layer (77 Å thick)/Ta layer (30 Å thick). The conductors to connect the end parts of the giant magnetoresistive effect elements were formed of Cr films, which were connected as shown in FIG. 11.

Next, the substrate was set in the center inside a copper hollow coil having the inner diameter of 50 mm and the length of 500 mm, in such a manner that the longitudinal direction of the giant magnetoresistive effect elements was perpendicular to the direction of central axis of the hollow coil. 3 kA of direct currents were flown for several seconds through the hollow coil to polarize the exchange bias layers, thereby pinning the orientations of magnetization axes of the pinned magnetic layers. The hollow coil is needed to have such a dimension that the substrate can be set inside thereof, and a magnetic field of a uniform direction can be regarded as being applied therein (about ten times of the substrate).

This substrate was incorporated into the rotary encoder of the structure shown in FIG. 3. A disc-form magnetic coding member was disposed with a gap of 0.5 mm from the surface of the substrate. 5 volts were applied to the input terminal of the substrate to measure the voltage on the output terminal, and the magnetic coding member was turned about the axis at a frequency of two turns per second. The diameter of the disc-form magnetic coding member employed was 12.7 mm, the polarization pitch was 0.71 mm, and the element pitch of the giant magnetoresistive effect elements was 0.72 mm.

As the result, the output approximate to a rectangular wave shown in FIG. 14 was achieved, which confirmed that a good and suitable waveform for a rotary encoder was obtained.

Figure 15:
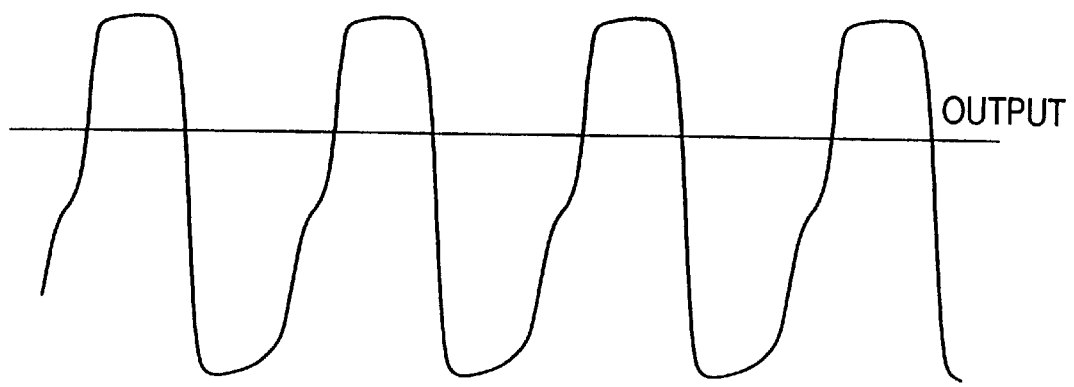
FIG. 15 is a chart to illustrate the other example of the output waveform obtained by the encoder of the example.
Figure 16:
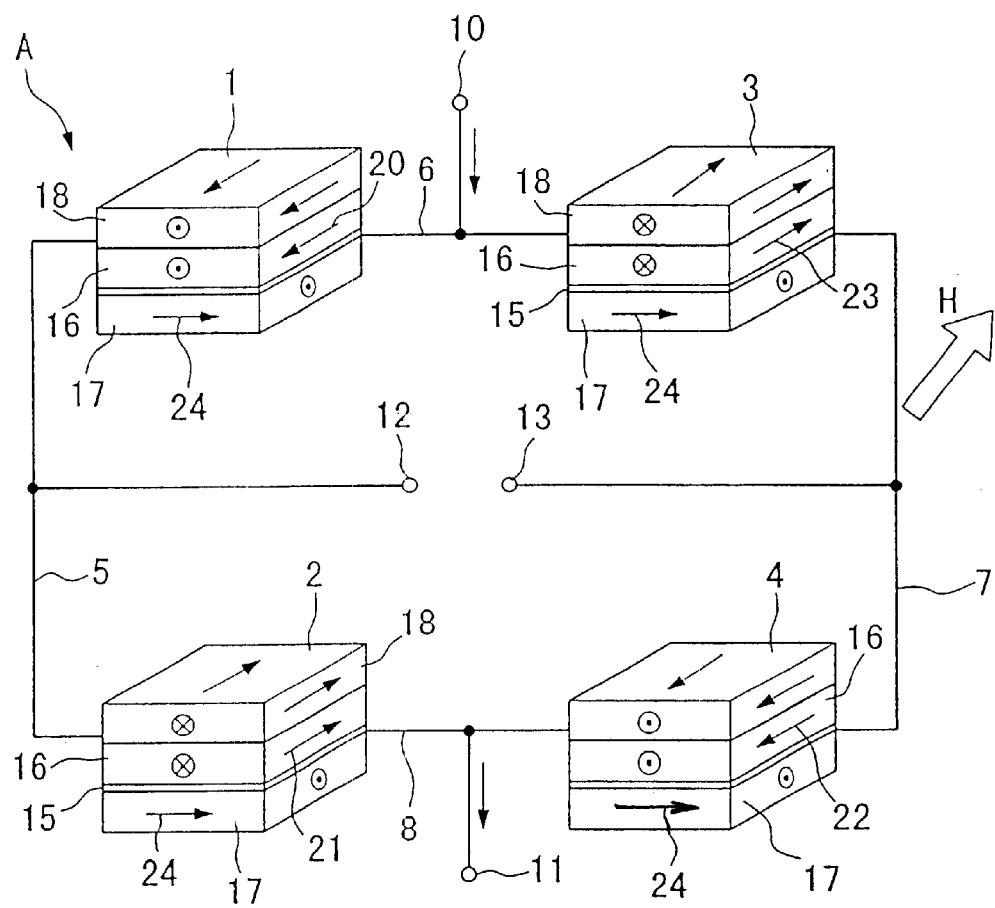
FIG. 16 is a schematic constructional chart to illustrate one example of a conventional magnetic sensor.
Figure 17:
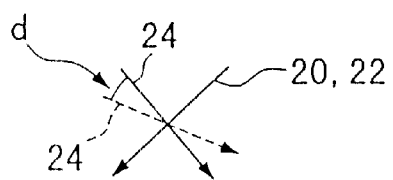
FIG. 17 is a chart to illustrate the orientations of magnetization axes of the pinned magnetic layers in relation to those of the free magnetic layers in the giant magnetoresistive effect elements provided in the conventional magnetic sensor shown in FIG. 16.

Next, FIG. 15 illustrates an output waveform when the gap between the giant magnetoresistive effect elements is increased by 20% against the polarization pitch of the magnetic coding member, namely, the output waveform obtained from the rotary encoder in which the giant magnetoresistive effect elements are formed on the substrate with the gap of 1.2 times the polarization pitch k. The conditions except for the gap between the giant magnetoresistive effect elements were made equal to those of the foregoing example, and the gap was set to 1.4 mm.

As clear from the rectangular wave output shown in FIG. 15, even if the polarization pitch was deviated by 20% against the gap between the giant magnetoresistive effect elements, the rotary encoder gave the rectangular wave output. The waveform shown in FIG. 15 is distorted to some extent, and contains noise components; however, the shape of rectangular wave itself remains uncollapsed, and the distorted wave of this extent can satisfactorily be used as the output of the rotary encoder.

This result found that although the relation of the polarization pitch of the magnetic coding member with the gap between the giant magnetoresistive effect elements is preferably the relation expressed by the equation (1), the deviation by about 20% from the equation (1) will not cause any difficulties in the input applications, etc.

From the aforementioned, since the encoder relating to the present invention will precisely detect the direction or angle of rotation of the magnetic coding member, the encoder can be applied to a non-contact rotary knob, for example, a volume knob, and the like.

As described above, in the rotary encoder of the present invention, at least a pair of giant magnetoresistive effect elements containing the pinned magnetic layers whose orientations of magnetization axes are made parallel in the same direction are formed on a substrate, and a magnetic coding member having the poles is rotatably disposed so as to face these giant magnetoresistive effect elements. Therefore, the rectangular waveform can be obtained by measuring the voltage variation of the center point of the pair of the giant magnetoresistive effect elements in accordance with the angle of rotation of the magnetic coding member, which enables the circuit to detect the state of rotation of the magnetic coding member and to be used for the rotary encoder.

And, using the giant magnetoresistive effect elements, the circuit structure is able to acquire a large resistance variation.

Since the circuit structure makes it possible to polarize the exchange bias layers of the first, second, third, and fourth giant magnetoresistive effect elements with the same magnetic field in the same direction at one time all together, setting the substrate inside a hollow coil, for example, and flowing currents through the hollow coil will polarize the four giant magnetoresistive effect elements at one time and fix the four orientations of magnetization axes of the pinned magnetic layers at the same time.

Accordingly, the structure makes the polarization work in production remarkably easy compared to the conventional structure that requires to polarize in four different directions. Therefore, the present invention will provide an encoder having a structure which connects four giant magnetoresistive effect elements, and yet shows very high productivity.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An encoder provided with giant magnetoresistive effect elements, comprising at least a pair of giant magnetoresistive effect elements that contain at least exchange bias layers, pinned magnetic layers whose orientations of magnetization axes are fixed in one direction by the exchange bias layers, nonmagnetic layers, and free magnetic layers whose orientations of magnetization axes are freely rotated by an external magnetic field, wherein:

said pair of giant magnetoresistive effect elements are supported on a substrate and are electrically interconnected;

said pair of giant magnetoresistive effect elements being configured such that the orientations of magnetization axes of the pinned magnetic layers of said pair of giant magnetoresistive effect elements are aligned in a same direction; and a magnetic coding member rotatably faces said pair of giant magnetoresistive effect elements.

2. An encoder provided with giant magnetoresistive effect elements according to claim 1, wherein an output terminal is formed on a part of one of the giant magnetoresistive effect elements, and an input terminal is formed on a part of one of the giant magnetoresistive effect elements.

3. An encoder provided with giant magnetoresistive effect elements according to claim 1, wherein a plurality of magnetic poles are alternately positioned with a specific pitch on a periphery of said magnetic coding member, and said magnetic coding member is supported to rotate with a specific gap detached from said substrate, wherein a periphery of the magnetic coding member faces said giant magnetoresistive effect elements.

4. An encoder provided with giant magnetoresistive effect elements according to claim 1, wherein a gap between said pair of giant magnetoresistive effect elements has a relation that satisfies the following expression when a pitch between a N pole and a S pole on said magnetic coding member is represented by $\lambda$ and the integer by n: $2n\lambda+\lambda$.

5. An encoder provided with giant magnetoresistive effect elements according to claim 1, wherein a first, a second, a third, and a fourth giant magnetoresistive effect elements overlie the substrate and are separated by at least a gap, and the gap between said giant magnetoresistive effect elements has a relation that satisfies the following expression when a polarization pitch on said magnetic coding member is represented by $\lambda$ and the integer by n: $2n\lambda+\lambda$.

6. An encoder provided with giant magnetoresistive effect elements according to claim 5, wherein, of parts to connect said first, second, third, and fourth giant magnetoresistive effect elements, two parts have input terminals formed thereon, and the remaining two have output terminals formed thereon.

7. An encoder comprising:

a plurality of magnetoresistive effect elements, each of said magnetoresistive effect elements comprising an exchange bias layer, a pinned magnetic layer having a fixed magnetization axis in one direction by said exchange bias layer, and a free magnetic layer having a magnetization axis rotated by an external magnetic field;

said magnetoresistive effect elements being electrically interconnected on a substrate and being configured such that said fixed magnetization axes face a same direction; and a rotatable magnetic coding member magnetically coupled to said magnetoresistive effect elements, said rotatable magnetic coding member having a plurality of magnetic poles formed along an outer periphery of said rotatable magnetic coding member.

8. An encoder according to claim 7, wherein said magnetoresistive effect elements are connected in series and share a common output terminal and each of said magnetoresistive effect elements are connected to a separate input terminal.

9. An encoder according to claim 7, wherein said rotatable magnetic coding member has a substantially disc-shape supporting said plurality of magnetic poles.

10. An encoder according to claim 7, wherein said magnetic poles comprise a North and a South pole separated by a pitch represented by a "$\lambda$" and wherein a gap separates said giant magnetoresistive effect elements, said gap being defined substantially by an expression "$2n\lambda+1$" where "n" is an integer.

11. An encoder according to claim 7, wherein each of said magnetoresistive effect elements being separated from adjacent magnetoresistive effect elements by a gap defined substantially by an expression "$2n\lambda+1$" where "n" is an integer and a "$\lambda$" represents a pitch between a North and a South pole.

12. An encoder according to claim 11, wherein said first and said second magnetoresistive effect elements share a common input terminal and said third and said fourth magnetoresistive effect elements share a common output terminal.

13. A method of generating magnetization axes for magnetoresistive effect elements of an encoder comprising:

winding a coil into a helix;

positioning a substrate having a plurality magnetoresistive effect elements along a central axis of said helix, said magnetoresistive elements being electrically interconnected on a substrate; and conducting a current through said coil until an exchange bias layer of each of said magnetoresistive effect elements is polarized and have a fixed magnetization axes that face a same direction.

14. A method of generating magnetization axes for magnetoresistive effect elements comprising:

winding a coil into a helix;

positioning a substrate having a plurality magnetoresistive effect elements along a central axis of said helix; and conducting a current through said coil until an exchange bias layer of each of said magnetoresistive effect elements is uniformly polarized and have magnetization axes that face a same direction wherein said magnetoresistive effect elements are configured to magnetically couple a rotatable magnetic coding member having a plurality of magnetic poles, wherein said magnetic poles comprise a North and a South pole separated by a pitch represented by a "$\lambda$" and wherein a gap separates adjacent giant magnetoresistive effect elements, said gap being defined substantially by an expression "$2n\lambda+1$" where "n" is an integer.

15. An encoder comprising:

a plurality of magnetoresistive effect elements, each of said magnetoresistive effect elements comprising an exchange bias layer, a pinned magnetic layer having a fixed magnetization axis in one direction by said exchange bias layer, and a free magnetic layer having a magnetization axis rotated by an external magnetic field;

said magnetoresistive effect elements being electrically interconnected and overlying a substrate and being configured such that said fixed magnetization axes face a same direction.

16. A method of generating magnetization axes for magnetoresistive effect elements of an encoder comprising:

positioning a substrate having a plurality magnetoresistive effect elements along a central axis of a helix, said magnetoresistive elements being electrically interconnected and overlying a substrate; and conducting a current through said coil until an exchange bias layer of each of said magnetoresistive effect elements is polarized and have a fixed magnetization axes that face a same direction.

* * * * *